United States Patent
Fernandez et al.

(10) Patent No.: US 10,493,934 B2
(45) Date of Patent: Dec. 3, 2019

(54) RADAR SUPPORT STRUCTURE

(71) Applicant: Nissan North America, Inc., Franklin, TN (US)

(72) Inventors: Omar Fernando Carrillo Fernandez, Estado de Mexico (MX); Alejandro Enrique Gonzalez, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 137 days.

(21) Appl. No.: 15/823,991

(22) Filed: Nov. 28, 2017

(65) Prior Publication Data

US 2019/0161041 A1  May 30, 2019

(51) Int. Cl.
*B60R 19/48* (2006.01)
*G01S 7/02* (2006.01)
*G01S 13/93* (2006.01)
*B60R 19/02* (2006.01)

(52) U.S. Cl.
CPC .......... *B60R 19/483* (2013.01); *B60R 19/023* (2013.01); *G01S 7/02* (2013.01); *G01S 13/931* (2013.01); *G01S 2007/027* (2013.01); *G01S 2013/9389* (2013.01)

(58) Field of Classification Search
CPC ....... B60R 19/483; B60R 19/023; G01S 7/02; G01S 13/931; G01S 2013/9389; G01S 2007/027
USPC ............. 296/193.09, 193.1, 193.11; 293/117
See application file for complete search history.

(56) References Cited

U.S. PATENT DOCUMENTS

| | | | | |
|---|---|---|---|---|
| 7,110,324 | B2 * | 9/2006 | Ho | B60R 19/483 340/435 |
| 8,744,743 | B2 * | 6/2014 | Kawasaki | B60R 19/483 180/68.1 |
| 9,673,517 | B2 * | 6/2017 | Tran | H01Q 1/1207 |
| 2014/0111370 | A1 * | 4/2014 | Aleem | B60R 19/483 342/70 |
| 2014/0313067 | A1 * | 10/2014 | Hsiao | G01S 13/42 342/27 |
| 2016/0137230 | A1 * | 5/2016 | Taneda | B62D 25/085 296/193.09 |
| 2016/0231417 | A1 | 8/2016 | Aoki et al. | |
| 2017/0222311 | A1 | 8/2017 | Hess et al. | |

* cited by examiner

*Primary Examiner* — Jason S Morrow
*Assistant Examiner* — E Turner Hicks
(74) *Attorney, Agent, or Firm* — Global IP Counselors, LLP

(57) ABSTRACT

A radar support structure includes a front bumper assembly, a radar bracket and a radar unit. The front bumper assembly has a support bracket, an energy absorbing member and a facia member attached to forward portions of a vehicle. The support bracket has a surface spaced apart from the energy absorbing member. The radar bracket is fixed to the surface of the support bracket and extends away from the energy absorbing member. The radar bracket includes two edge portions with a concaved area defining a mounting surface being located between the two projecting edges. The radar unit is installed to the mounting surface within the concaved area such that the two edge portions are located forward of a front most surface of the radar unit.

16 Claims, 6 Drawing Sheets

RADAR SUPPORT STRUCTURE

BACKGROUND

Field of the Invention

The present invention generally relates to a radar support structure. More specifically, the present invention relates to a radar support structure that includes a radar bracket with a concaved area with a mounting surface with a radar unit attached to the mounting surface such that projecting edges of the radar bracket protect the radar unit.

Background Information

A radar unit of a vehicle is often installed on a bracket attached to a front bumper.

SUMMARY

One object of the present disclosure is to provide a radar bracket with a mounting area that receives a radar unit with a pair of walls having edge portions that protect the radar unit.

In view of the state of the known technology, one aspect of the present disclosure is to provide a radar support structure with a front bumper, a radar bracket and a radar unit. The front bumper assembly has a support bracket, an energy absorbing member and a facia member attached to forward portions of a vehicle. The support bracket has a surface spaced apart from the energy absorbing member. The radar bracket is fixed to the surface of the support bracket and extends away from the energy absorbing member. The radar bracket includes two edge portions with a concaved area defining a mounting surface located between the two projecting edges. The radar unit is installed to the mounting surface within the concaved area such that the two edge portions are located forward of a front most surface of the radar unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
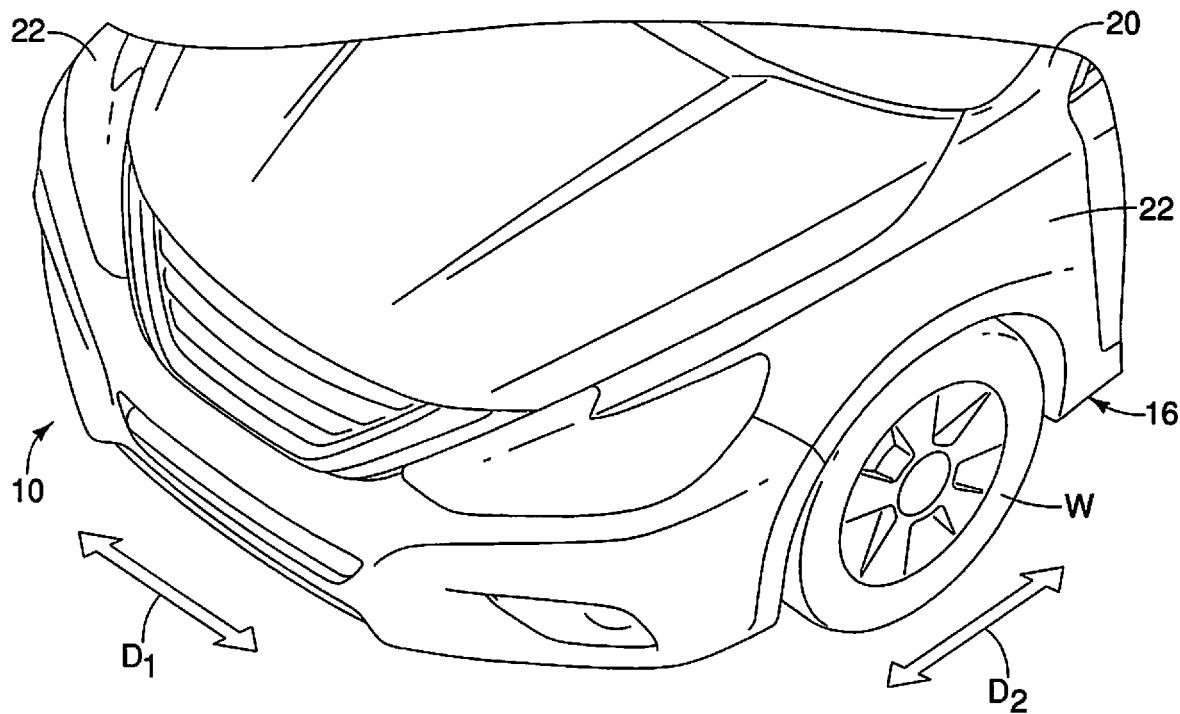
FIG. 1 is a perspective view of a front portion of a vehicle showing a vehicle body structure and a bumper assembly in accordance with the first embodiment.
Figure 2:
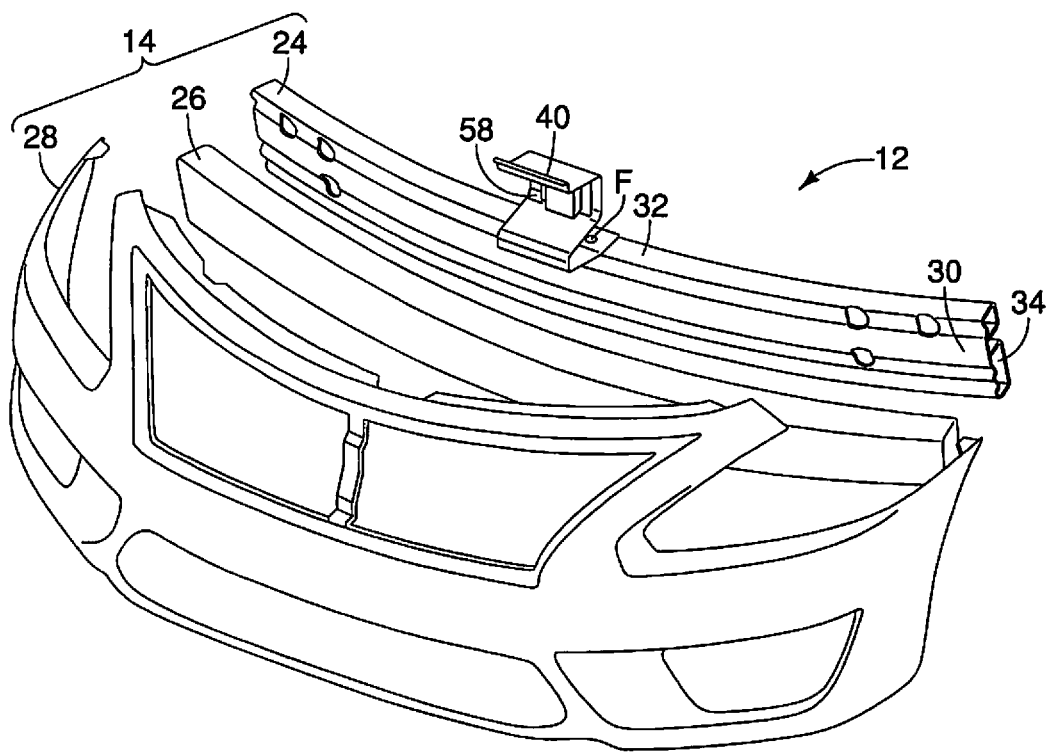
FIG. 2 is an exploded perspective view of the bumper assembly, a radar support structure and a radar unit installed to the radar support structure in accordance with the first embodiment.

Referring initially to FIGS. 1 and 2, a vehicle 10 that includes a radar support structure 12 (FIG. 2) is illustrated in accordance with a first embodiment.

As shown in FIG. 2, the radar support structure 12 is in part defined by a front bumper assembly 14. The front bumper assembly 14 and the radar support structure 12 are described in greater detail below.

The vehicle 10 includes a vehicle body structure 16 that includes, among other things, an A-pillar structure 20, fenders 22, wheel suspension and steering structures (not shown) that support front wheels W. Since the various elements of vehicle body structures are conventional automotive features, further description is omitted for the sake of brevity.

As shown in FIG. 2, the front bumper assembly 14 includes a support bracket 24, an energy absorbing member 26 and a fascia member 28.

The support bracket 24 includes at least a front surface 30, a top surface 32 (also referred to as the upper surface 32) and a rear surface 34. The front surface 30 can be curved or countered as shown in FIG. 2 to meet the needs of the overall design of the vehicle 10, or can be generally flat. The upper surface 32 has an overall level or horizontal shape that preferably extends in a vehicle lateral direction $D_1$ of the vehicle 10 (see FIG. 1). The vehicle lateral direction $D_1$ is perpendicular to a vehicle longitudinal direction $D_2$ of the vehicle 10.

The support bracket 24 is fastened to a forward portion of the vehicle body structure 16 in a conventional manner via, for example, mechanical fasteners (not shown). Since attachment of support brackets to vehicle body structures are conventional structural arrangements, further description is omitted for the sake of brevity.

The energy absorbing member 26 is fastened to the front surface 30 of the support bracket 24 via mechanical fasteners (not shown) in a conventional manner. The fascia member 28 can be attached to one or both of the support bracket 24 and/or the energy absorbing member 26, but is preferably fixed to the vehicle body structure 16 at various locations (not shown), via mechanical fasteners, such as threaded members, snap-fitting members, rivets, etc. Since attachment structures between bumper facia members and vehicle body structures are conventional structures, further description is omitted for the sake of brevity.

Figure 3:
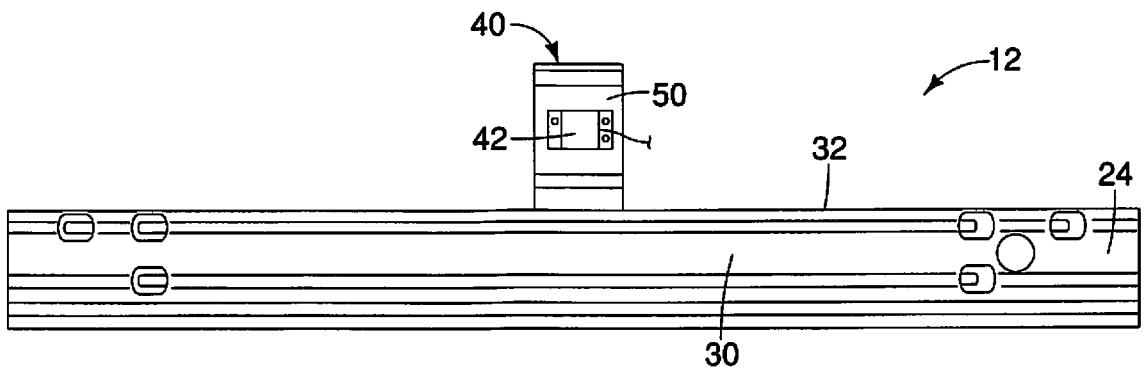
FIG. 3 is a front view of the radar support structure showing a support bracket of the bumper assembly and a radar bracket attached to the support bracket of the bumper assembly in accordance with the first embodiment.
Figure 4:
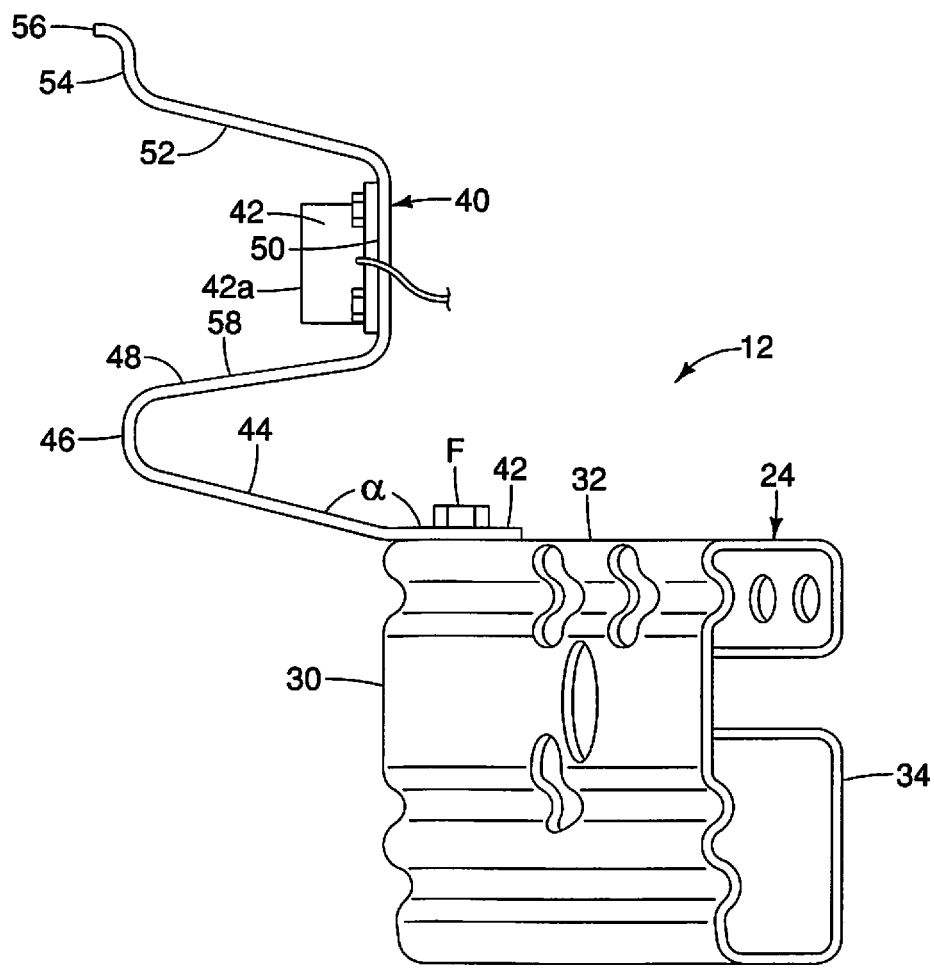
FIG. 4 is a side view of the radar support structure showing the support bracket of the bumper assembly, the radar bracket attached to the support bracket of the bumper assembly and the radar unit installed to the radar bracket within a concaved area of the radar bracket in accordance with the first embodiment.
Figure 5:
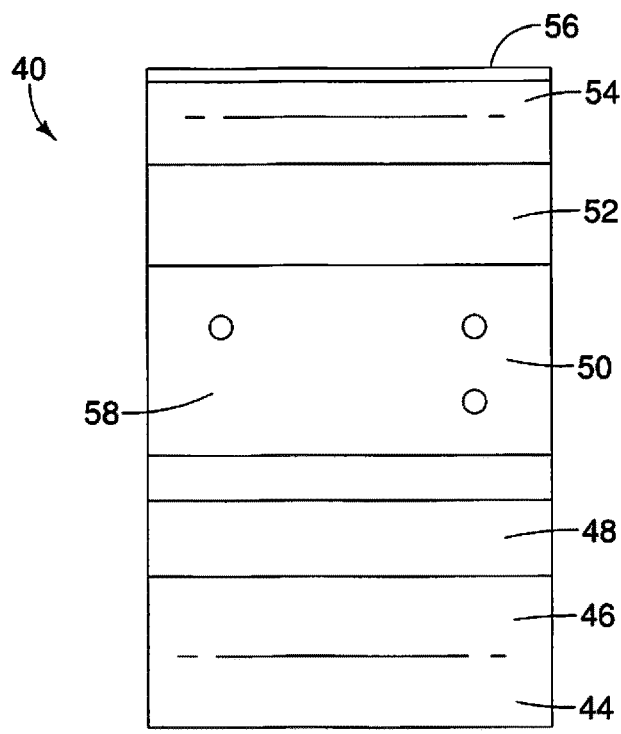
FIG. 5 is a front view of the radar bracket shown removed from the bumper assembly in accordance with the first embodiment.
Figure 6:
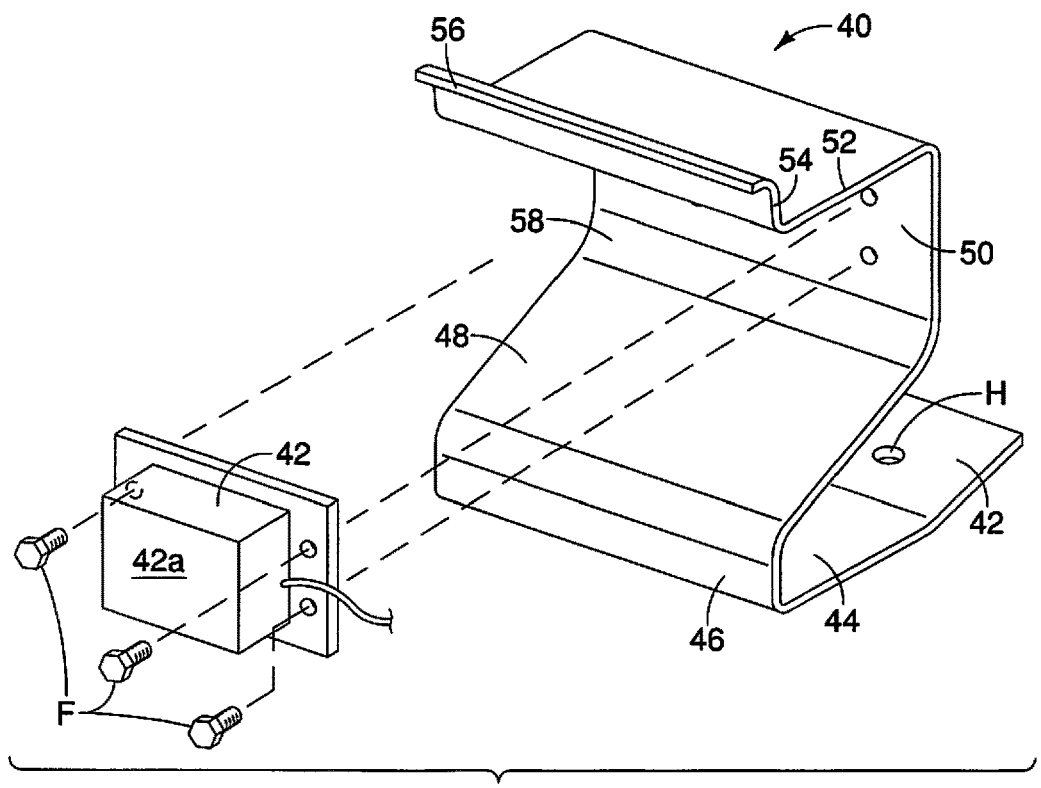
FIG. 6 is an exploded perspective view of the radar bracket and the radar unit in accordance with the first embodiment.
Figure 7:
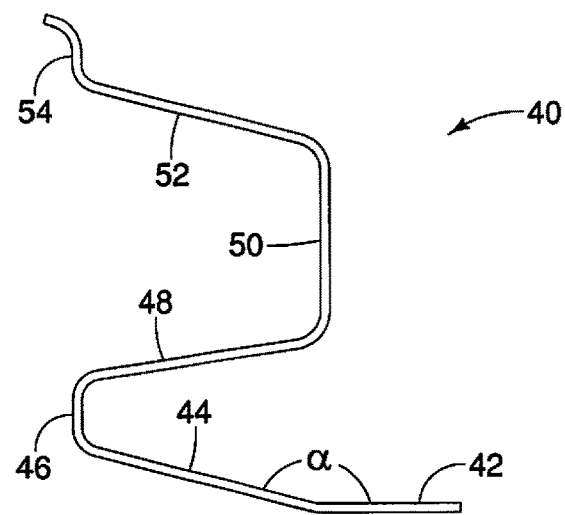
FIG. 7 is a side view of the radar bracket shown removed from the bumper assembly in accordance with the first embodiment.

The radar support structure 12 includes a radar bracket 40 that is attached to the upper surface 32 of the support bracket 24. As shown in FIGS. 2, 3 and 4, the radar bracket 40 is installed to a central or center of the support bracket 24. However, it should be understood from the drawings and description herein that the radar bracket 40 can be installed at any convenient location along the support bracket 24 depending upon the overall design of the vehicle 10, and considerations for other elements installed in the front area of the vehicle 10 and concealed by the facia member 28. The radar bracket 40 extends upward and away from the support bracket 24 and away from the energy absorbing member 26. A radar unit 42 is installed to the radar bracket 40 in a manner described in greater detail below.

The radar bracket 40 is made from sheet metal or other metallic material that exhibits the properties as described herein below. As shown in FIGS. 4-10, the radar bracket 40 includes a bottom flange portion 42, an inclined portion 44, a lower front wall 46, a lower inner wall 48, a mounting surface 50, an upper inner wall 52 and an upper front wall 54. In the embodiment where the radar bracket 40 is made of metal, such as sheet metal, the material is deformed in order to define the bottom flange portion 42, the inclined portion 44, the lower front wall 46, the lower inner wall 48, the mounting surface 50, the upper inner wall 52 and the upper front wall 54. The radar bracket 40 is therefore a single, monolithic unitary element formed without seams or breaks. In the preferred embodiment, a single sheet of metal material is used to define the bottom flange portion 42, the inclined portion 44, the lower front wall 46, the lower inner wall 48, the mounting surface 50, the upper inner wall 52 and the upper front wall 54.

The bottom flange portion 42 is generally flat and includes fastener holes H (see FIG. 6) that receive fasteners F that fixedly attach the radar bracket 40 to the support bracket 24, as shown in FIG. 4. Although only one of the holes H and one fastener F are shown in FIG. 4, it should be understood from the drawings and description herein that two or more holes H and fasteners F can be used to install the radar bracket 40 to the support bracket 24, as shown in FIGS. 6 and 8-10.

The inclined portion 44 extends forward and upward from the bottom flange portion 42. Specifically, the inclined portion 44 is inclined upward relative to the bottom flange portion 42. Adjacent upper surfaces of the inclined portion 44 and the bottom flange portion 42 define an angle $\alpha$ therebetween. The angle $\alpha$ is an obtuse angle with a vertex of the obtuse angle being defined along the intersecting portion. In the depicted embodiment, the angle $\alpha$ approximately 168 degrees. However, the angle $\alpha$ can be any value between 150 and 170 degrees, or between 160 and 170 degrees.

The lower front wall 46 extends upward from a forward upper end of the inclined portion 44. The lower inner wall 48 extends rearward from an upper end of the lower front wall 46. The lower inner wall 48 is inclined upward as one moves rearward along the lower inner wall 48. The mounting surface 50 extends upward from a rearmost portion of the lower inner wall 48. The upper inner wall 52 then extends forward from an upper end of the mounting surface 50. The upper front wall 54 extends upward from a forward most portion of the upper inner wall 52. The upper front wall 54 can optionally include a distal end 56 thereof that extends further upward and forward of the upper front wall 54.

The lower front wall 46 and the upper front wall 54 define a pair of front edge portions of the radar bracket 40. Further the lower inner wall 48, the mounting surface 50 and the upper inner wall 52 define a concave area 58. As shown in FIGS. 4 and 6-10, the two edge portions (the lower front wall 46 and the upper front wall 54), and the mounting surface 50 define a C-shape as viewed in a side view cross-section.

As is described further below, the two edge portions (the lower front wall 46 and the upper front wall 54) provide protection to the mounting surface 50 and the concaved area 58. Specifically, in the event of an impact event, where an impacting force $I_F$ (FIGS. 8, 9 and 10) contacts the front of the vehicle 10 and the bumper assembly 14, the lower front wall 46 and the upper front wall 54 (two edge portions) receive a portion of the force from the impacting force $I_F$, imparted to the vehicle 10.

Figure 8:
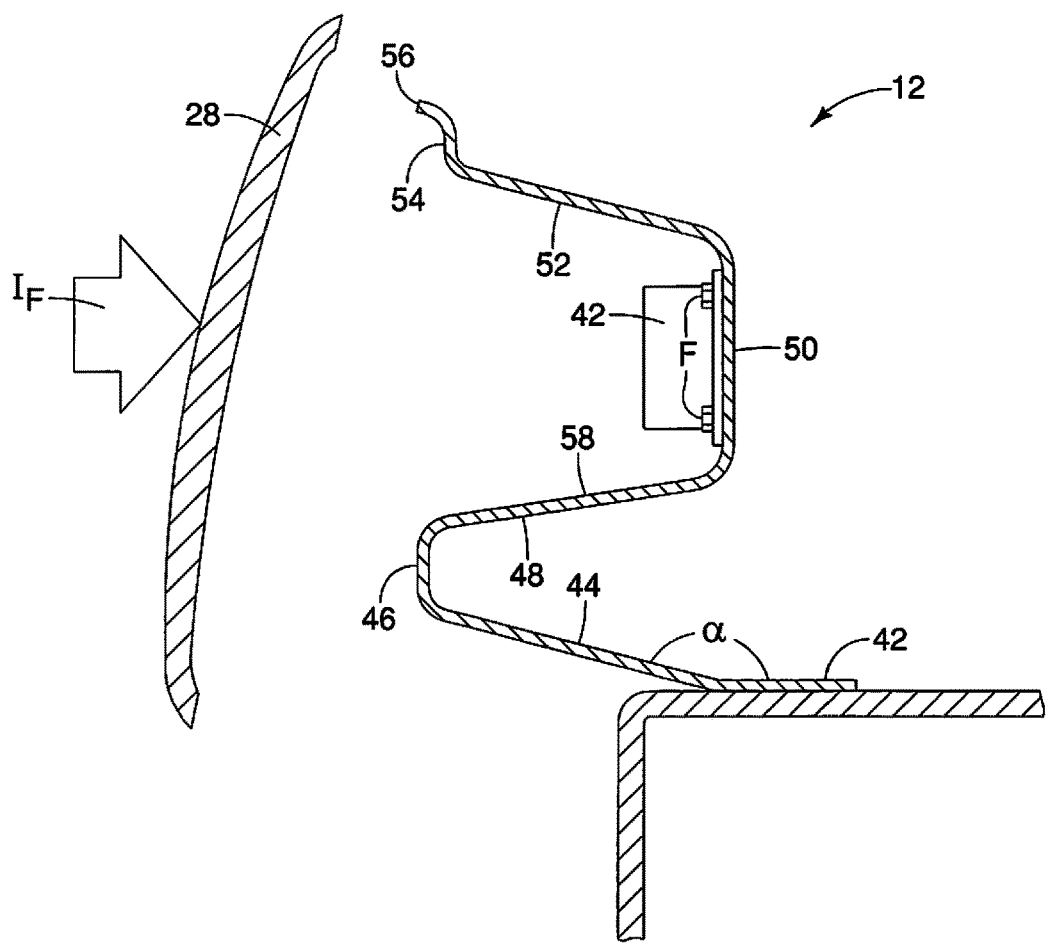
FIG. 8 is a side view of the support bracket and a bumper facia of the bumper assembly, the radar bracket and the radar unit shown in a non-impacted state in accordance with the first embodiment.

As shown in FIGS. 4 and 8, the two edge portions (the lower front wall 46 and the upper front wall 54) extend forward of the support bracket 24 of the front bumper assembly 14.

The radar unit 42 is installed to the mounting surface 50 within the concaved area 58 such that the two edge portions (the lower front wall 46 and the upper front wall 54) are located forward of a front most surface 42a of the radar unit 42.

The radar unit 42 is part of a radar system (not shown) of the vehicle 10 that includes, for example, an electronic controller (with micro-processor and memory) and a display (not shown) within a passenger compartment of the vehicle. The radar unit 42 detects proximity to other vehicles and obstacles forward of the vehicle 10. The electronic controller processes signals from the radar unit 42 and displays information for a vehicle operator's use. The display of the radar system can be replaced with, or can include an audio device that provides audio signals to the vehicle operator in response to detection of vehicles and/or objects ahead of the vehicle 10. Since radar systems are conventional vehicle components, further description is omitted for the sake of brevity.

Figure 9:
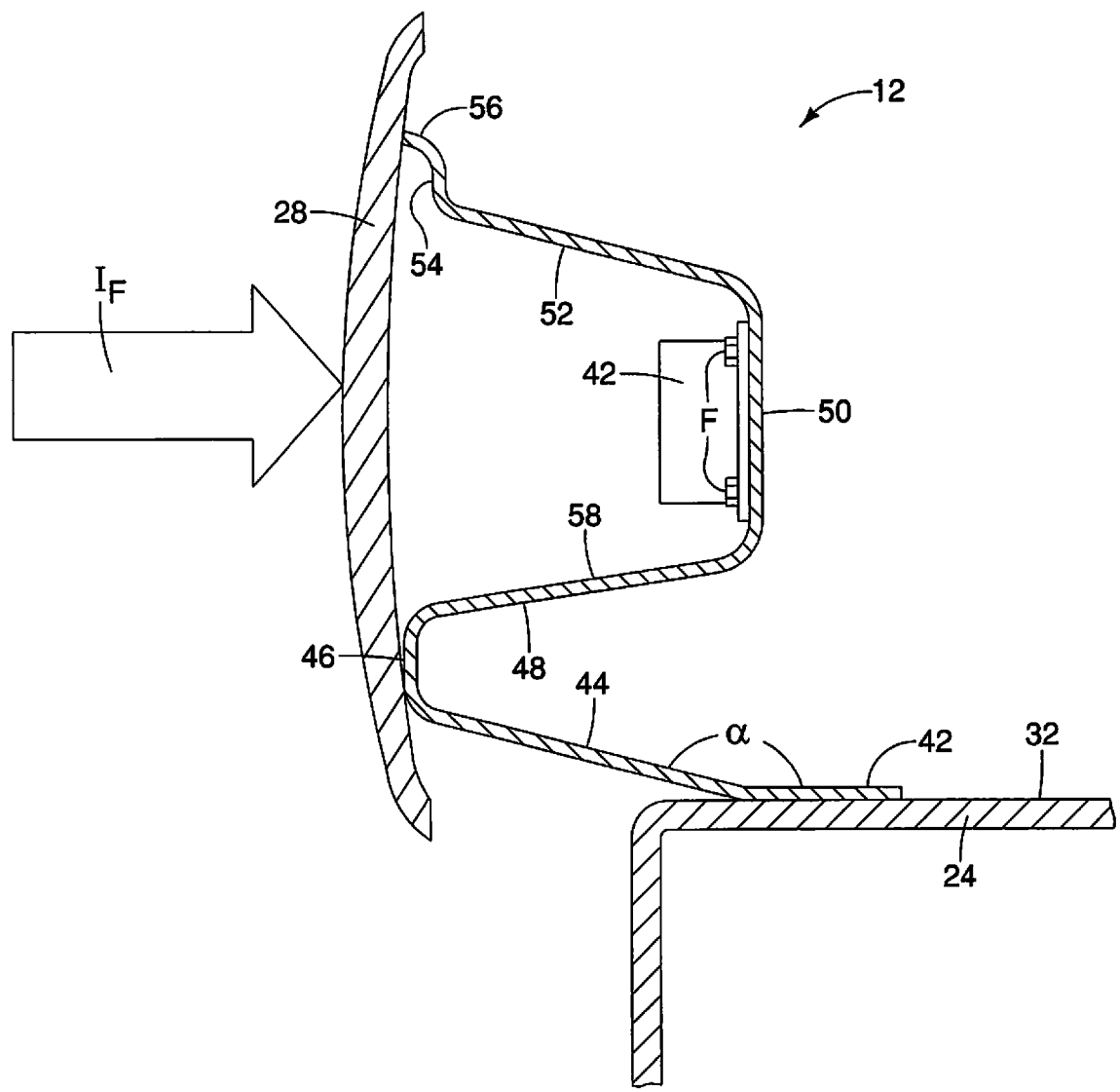
FIG. 9 is another side view similar to FIG. 8 showing the support bracket and the bumper facia of the bumper assembly, the radar bracket and the radar unit in an intermediate stage of an impact event in accordance with the first embodiment.
Figure 10:
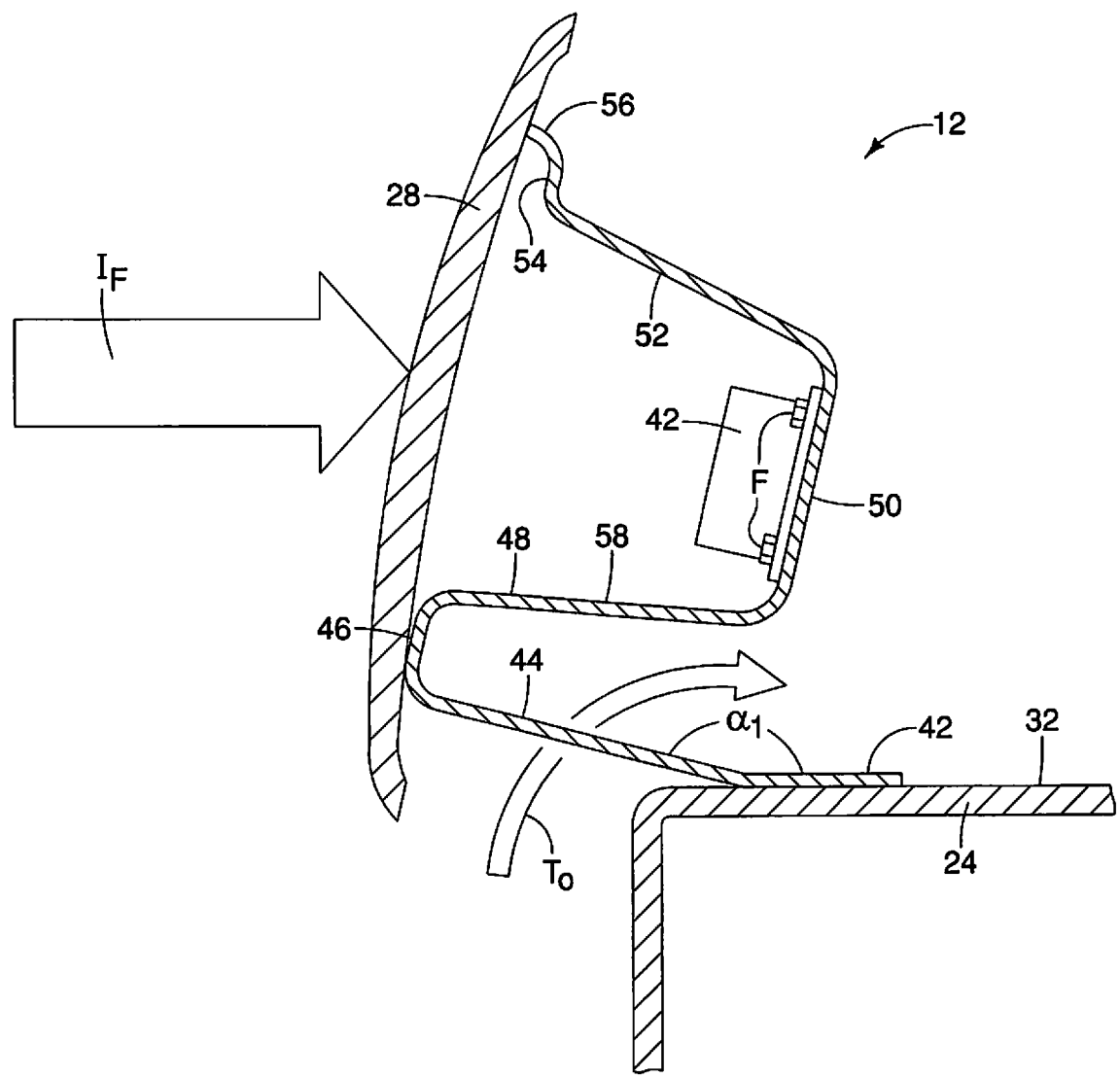
FIG. 10 is yet another side view similar to FIGS. 8 and 9 showing the support bracket and the bumper facia of the bumper assembly, the radar bracket and the radar unit in a final stage of the impact event in accordance with the first embodiment.

As shown in FIGS. 8-10, when installed to the bumper assembly 14, the forward most portions of the radar bracket 40 are the lower front wall 46 and the upper front wall 54. The lower front wall 46, the mounting surface 50 and the upper front wall 54 defined the concave area 58 that receives the radar unit 42 with the radar unit 42 fastened to the mounting surface 50. As mentioned above, the lower front wall 46 and the upper front wall 54 define two protruding edge portions of the radar bracket 40 that are located forward of the front most surface 42a of the radar unit 42.

FIGS. 8, 9 and 10 show the effects of an impact event to the front of the vehicle 10 at an area proximate the radar unit 42. A portion of the impacting force $I_F$ is imparted to the facia member 28 causing the facia member 28 to deform (elastic and/or plastic deformation depending upon the overall design of the facia member 28) pushing it rearward into contact with the radar bracket 40, as demonstrated by comparing FIG. 8 with FIG. 9. As the impact event progresses, a portion of the angle $\alpha_1$ that e facia member 28 causing the facia member 28 to push against the radar bracket 40 causing the radar bracket 40 to pivot about an intersection between the bottom flange portion 42 and the inclined portion 44 of the radar bracket 40, as shown in FIG. 10. During such pivoting movement of the radar bracket 40 relative to the bottom flange portion 42, the angle $\alpha$ defined between the bottom flange portion 42 and the inclined portion 44 is reduced to an angle $\alpha_1$ that is smaller than the angle α. The actual size of the angle $α_1$ is dependent upon the strength of the impacting force $I_F$ relative to the vehicle 10.

Further, if the impacting force $I_F$ is such that the object (not shown) providing the impacting force $I_F$ extends below the top surface 32 of the bumper assembly 14, the further impacting forces cause to object to contact the support bracket 24 such that impacting forces are not imparted to the radar unit 42. With the radar unit 42 installed within the concave area 58, the lower front wall 46 and the upper front wall 54 (protruding edge portions) basically protect the radar unit 42, preventing the radar unit 42 from receiving any force (or damage) from the impacting force $I_F$.

The various vehicle structures and components of the vehicle 10 other than the radar support structure 12, are conventional components that are well known in the art. Since vehicle structures and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the radar support structure. Accordingly, these terms, as utilized to describe the present invention should be interpreted relative to a vehicle equipped with the radar support structure.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A radar support structure, comprising:
   a front bumper assembly having a support bracket, an energy absorbing member and a facia member attached to forward portions of a vehicle, the support bracket having a surface spaced apart from the energy absorbing member, the surface of the support bracket being an upper surface thereof and is a horizontal surface that extends in a vehicle lateral direction;
   a radar bracket fixed to the surface of the support bracket and extending away from the energy absorbing member, the radar bracket including two edge portions with a concaved area defining a mounting surface being located between the two projecting edges; and
   a radar unit installed to the mounting surface within the concaved area such that the two edge portions are located forward of a front most surface of the radar unit.

2. The radar support structure according to claim 1, wherein
   the radar bracket is installed to the surface above the front bumper assembly.

3. The radar support structure according to claim 1, wherein
   the two edge portions and the concaved area define a C-shape as viewed in a side view cross-section.

4. The radar support structure according to claim 1, wherein
   the two edge portions extend forward of the support bracket of the front bumper assembly.

5. A radar support structure, comprising:
   a front bumper assembly having a support bracket, an energy absorbing member and a facia member attached to forward portions of a vehicle, the support bracket having a surface spaced apart from the energy absorbing member;
   a radar bracket fixed to the surface of the support bracket and extending away from the energy absorbing member, the radar bracket including two edge portions with a concaved area defining a mounting surface being located between the two projecting edges, the radar bracket including a bottom flange portion, an inclined portion extending forward and upward from the bottom flange portion and a lower front wall extending upward from the inclined portion, the lower front wall defining a first of the two edge portions; and
   a radar unit installed to the mounting surface within the concaved area such that the two edge portions are located forward of a front most surface of the radar unit.

6. The radar support structure according to claim 5, wherein
   the bottom flange portion and the inclined portion define an intersecting portion therebetween, the intersection area being configured such that the inclined portion pivots about the intersecting area in response to impacting forces acting on the two edge portions.

7. The radar support structure according to claim 6, wherein
the bottom flange portion and the inclined portion define an obtuse angle therebetween with a vertex of the obtuse angle being defined along the intersecting portion.

8. The radar support structure according to claim 7, wherein
the obtuse angle is between 160 and 170 degrees.

9. The radar support structure according to claim 8, wherein
the obtuse angle is 168 degrees.

10. The radar support structure according to claim 5, wherein
the radar bracket further includes a lower inner wall and an upper inner wall, the lower inner wall extending rearward from the lower front wall to a lower end of the mounting surface, and the upper inner wall extending forward from an upper end of the mounting surface such that the lower inner wall, the mounting surface and the upper inner wall define the concave area.

11. The radar support structure according to claim 1, wherein
the radar bracket includes a bottom flange portion, an inclined portion, a lower front wall, a lower inner wall and an upper inner wall, the inclined portion extending forward and upward from the bottom flange portion, the lower front wall extending upward from the inclined portion with an upper end of the lower front wall defining a lower one of the two edge portions, the lower inner wall extending rearward from the upper end of the front wall to a lower end of the mounting surface, and the upper inner wall extending forward from an upper end of the mounting surface such that the lower inner wall, the mounting surface and the upper inner wall define the concave area.

12. A radar support structure, comprising:
a front bumper assembly having a support bracket, an energy absorbing member and a facia member attached to forward portions of a vehicle, the support bracket having an upper surface;
a radar bracket fixed to the upper surface of the support bracket and extending away from the energy absorbing member, the radar bracket including two edge portions with a concaved area defining a mounting surface being located between the two projecting edges; and
a radar unit installed to the mounting surface within the concaved area such that the two edge portions are located forward of a front most surface of the radar unit;
the radar bracket includes a bottom flange portion, an inclined portion extending forward and upward from the bottom flange portion and a lower front wall extending upward from the inclined portion, the lower front wall defining a first of the two edge portions.

13. The radar support structure according to claim 12, wherein the bottom flange portion and the inclined portion define an intersecting portion therebetween, the intersection area being configured such that the inclined portion pivots about the intersecting area in response to impacting forces acting on the two edge portions.

14. The radar support structure according to claim 13, wherein
the bottom flange portion and the inclined portion define an obtuse angle therebetween with a vertex of the obtuse angle being defined along the intersecting portion.

15. The radar support structure according to claim 14, wherein
the obtuse angle is between 160 and 170 degrees.

16. The radar support structure according to claim 15, wherein
the obtuse angle is 168 degrees.

* * * * *